R. L. BARNHART.
ELECTRICALLY OPERATED ANIMAL TRAP.
APPLICATION FILED APR. 19, 1911.
1,020,341.
Patented Mar. 12, 1912.
2 SHEETS—SHEET 1.
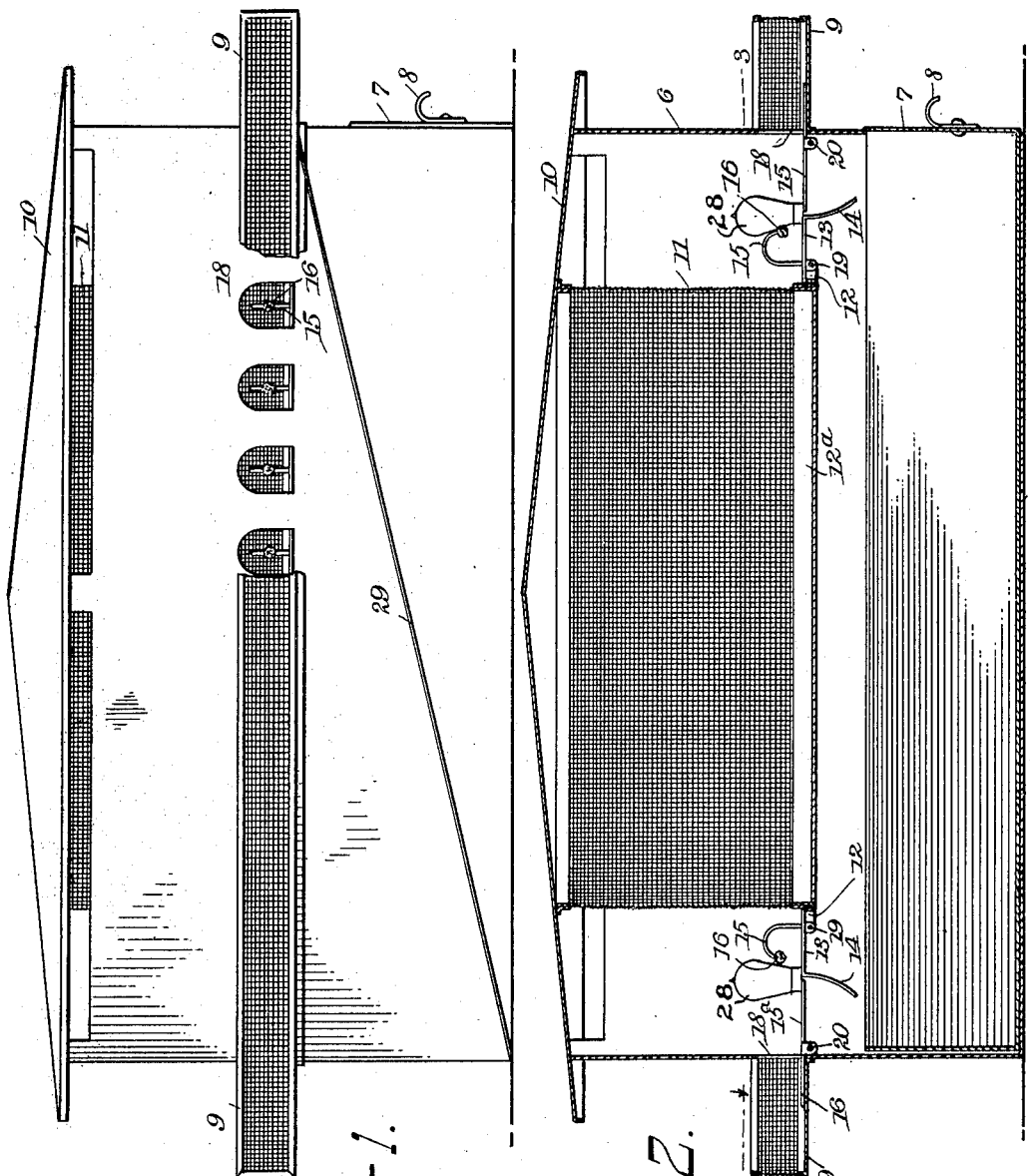
WITNESSES
George Bambay.
Walton Harrison,
INVENTOR
Robert L. Barnhart
BY
ATTORNEYS

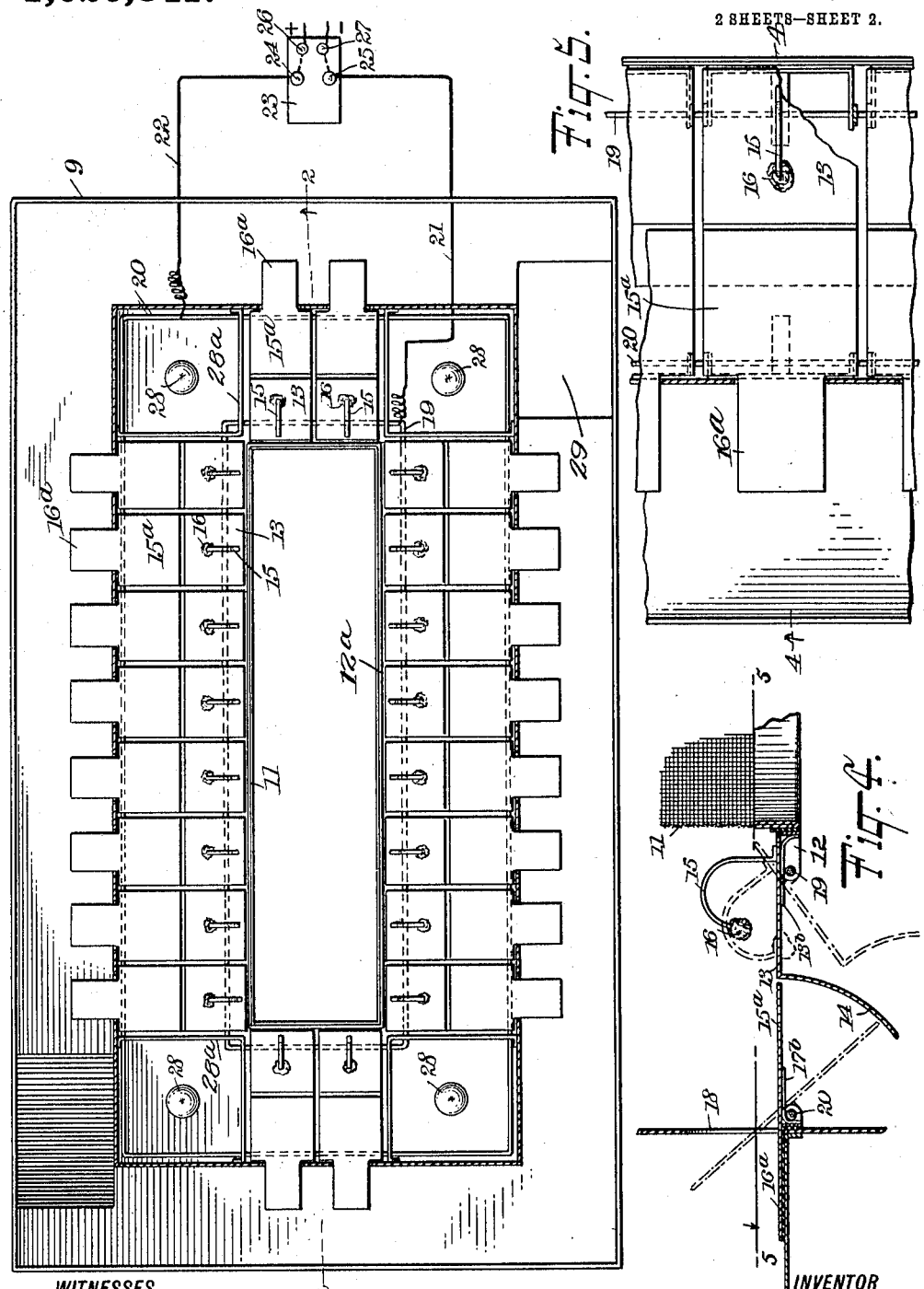

UNITED STATES PATENT OFFICE.

ROBERT L. BARNHART, OF CHARLEROI, PENNSYLVANIA.

ELECTRICALLY-OPERATED ANIMAL-TRAP.

1,020,341. Specification of Letters Patent. Patented Mar. 12, 1912.

Application filed April 19, 1911. Serial No. 622,137.

*To all whom it may concern:*

Be it known that I, ROBERT L. BARNHART, a citizen of the United States, and a resident of Charleroi, in the county of Washington and State of Pennsylvania, have invented a new and Improved Electrically-Operated Animal-Trap, of which the following is a full, clear, and exact description.

My invention relates to animal traps, my more particular purpose being to produce a rat trap in which the rat is killed by an electric current and the body of the rat is automatically dropped into a receptacle for this purpose.

My invention further relates to various improvements in animal traps, and particularly in rat traps employing an electric current for killing the rat.

Reference is to be had to the accompanying drawings forming a part of this specification, in which like characters of reference indicate corresponding parts in all the views, and in which—

Figure 1 is a side elevation partly broken away, showing my improved rat trap; Fig. 2 is a vertical section on the line 2—2 of Fig. 3, looking in the direction of the arrow; Fig. 3 is a horizontal section through the trap complete, and is taken substantially on the line 3—3 of Fig. 2, looking in the direction of the arrow; Fig. 4 is a detail, showing in section, one pair of electrically energized trap doors; and Fig. 5 is a fragmentary section on the line 5—5 of Fig. 4, looking in the direction of the arrow.

The body of the trap is shown at 6, and has generally the form of a box. It contains a removable drawer 7 provided with a handle 8 and adapted to receive the bodies of the rats. A gallery 9 encircles the body portion of the trap. A roof 10 is also provided for the trap. Connected with this roof and depending from it is a wire cage 11 in which may be imprisoned a number of living rats to serve as decoys. Mounted upon bearings 12 and insulated from the cage 11, and from various other parts, is a number of trap doors 13 made of metal and each provided with a portion 14 extending downwardly and curved slightly, the curvature representing an arc of a circle. The cage 11 has a bottom 12$^a$ about level with the trap doors 13. Engaging each trap door 13 upon its under side is a leaf spring 13$^b$, the strength of which barely suffices to keep the upper portion of the trap door approximately level, as indicated in Fig. 4. Each trap door 13 carries a bait hook 15 for supporting a bait 16.

Adjacent to each trap door 13 is another trap door 15$^a$ provided with a narrow portion 16$^a$ integral with it. This trap door is journaled upon a wire 20 which serves the purpose of a number of pivot pins and is insulated from various metallic parts adjacent to it. Engaging the under side of the trap door 15$^a$ is a leaf spring 17$^b$, the strength of which is just sufficient to keep the trap door 15$^a$ level—that is, substantially in registry with the upper portion of the trap door 13. Each trap door 15$^a$ is associated with an opening 18 through which it extends, as will be understood from Fig. 4. I provide quite a number of these openings 18. They are on substantially the same level as the gallery 9 (see Fig. 1). The cage 11 is provided with a bottom 12$^a$ for supporting rats or other living animals within the cage 11.

The various doors 13 are mounted upon a wire 19 which extends in the form of a square loop entirely around the cage 11. The wire 20 extends around the cage 11, but at a greater distance than the wire 19, from said cage. Connected with the wires 19, 20 are two other wires 21, 22. These lead to binding posts 24, 25, which are mounted upon a board 23. Other binding posts 26, 27 are mounted upon this board and are in communication with the binding posts 24, 25. Four electric lamps 28 are mounted at the four corners of the body portion 6, and are so arranged as to shed a diffused light. At 28$^a$ are braces used for supporting the lamps 28. The binding posts 26, 27 are connected with any suitable electrodes of opposite sign, and in which the difference of potential is sufficient to kill a rat. Two runways 29 extend from the floor to the gallery 9 for enabling the rats to reach this gallery.

The operation of my device is as follows:—Pieces of bait 16 are mounted upon the various bait hooks 15 and the several mechanical parts above described being properly arranged and adjusted, the apparatus is ready for use. If the operator so desires, he can place rats for use as decoys, or other living animals for use as bait, in the cage 11. Suppose, now, that a rat is attracted by the bait. The animal approaches and walks up a runway 29 to the gallery 9. He next passes through one of the openings 18, and in doing this his weight rests upon the trap door 15ª. After the center of gravity of the rat passes the wire 20, the trap door tilts. The rat then slides or rolls obliquely downward, the door 15ª assuming the position indicated in Fig. 4. The rat in sliding or rolling downwardly touches the portion 14. The animal's body thus forms a bridge between the trap doors 13 and 15ª. The following circuit is thus completed:—source of electricity, binding post 27, binding post 25, wire 21, wire 19, trap door 13, body of rat, trap door 15ª, wire 20, wire 22, binding posts 24 and 26, thence back to source of electricity. The rat being subjected to the action of the current thus traced is instantly killed. His weight being now thrown partly upon the portion 14 of the trap door 13, this trap door is tilted and the body of the rat is precipitated into the drawer 7. The trap doors 15ª and 13 are now restored to normal position by action of the springs 15ᵇ, 13ᵇ, and the trap is now ready for further use.

From the foregoing description it will be noted that the trap is practically always set and that it is self-setting, both as regards to the electric current, the bait employed and the positions of the trap doors.

I do not limit myself to the sizes indicated for the various parts, nor to the precise details shown, as various changes may be made therein without departing from the spirit of my invention.

Having thus described my invention, what I claim as new and desire to secure by Letters Patent is:—

1. An animal trap comprising a pair of trap doors movable independently of each other, and means for completing an electric circuit from one of said doors through the body of the animal to be trapped and through the other door.

2. An animal trap comprising a trap door, a bait hook mounted thereupon and movable therewith for the purpose of holding bait, another trap door disposed adjacent to said first-mentioned trap door, and means for completing an electric circuit through both of said trap doors and through the body of the animal to be trapped.

3. An animal trap comprising a trap door made of metal and provided with a portion extending downwardly, said portion being bent into arcuate form, another trap door provided with a portion extending toward the portion thus bent and adapted to swing in close proximity to the bent portion, and means for completing an electric circuit through the body of an animal and through both of said trap doors including said bent portion.

In testimony whereof I have signed my name to this specification in the presence of two subscribing witnesses.

ROBERT L. BARNHART.

Witnesses:
HARRY H. DAVIS,
M. J. McGUIRE.

---

Copies of this patent may be obtained for five cents each, by addressing the "Commissioner of Patents, Washington, D. C."